(12) United States Patent
Learned (10) Patent No.: US 7,190,743 B2
(45) Date of Patent: Mar. 13, 2007

(54) METHOD AND APPARATUS FOR OPTIMIZING TREE PRUNING IN A MULTIUSER DETECTOR

(75) Inventor: Rachel E. Learned, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 777 days.

(21) Appl. No.: 10/207,490

(22) Filed: Jul. 29, 2002

(65) Prior Publication Data

US 2004/0017863 A1  Jan. 29, 2004

(51) Int. Cl.
*H03D 1/00* (2006.01)
(52) U.S. Cl. ..................................................... 375/340
(58) Field of Classification Search ................ 375/136, 375/224, 262, 263, 290, 340, 341, 346, 265; 714/792, 796, 786; 341/107, 51, 79, 109
See application file for complete search history.

(56) References Cited

U.S. PATENT DOCUMENTS

| | | | |
|---|---|---|---|
| 5,268,686 A * | 12/1993 | Battail ........................ 341/107 |
| 5,790,606 A | 8/1998 | Dent | |
| 5,982,813 A | 11/1999 | Dutta et al. | |
| 6,122,269 A | 9/2000 | Wales | |
| 6,154,507 A * | 11/2000 | Bottomley .................. 375/340 |
| 6,198,775 B1 | 3/2001 | Khayrallah et al. | |
| 6,219,341 B1 | 4/2001 | Varanasi | |
| 6,304,618 B1* | 10/2001 | Hafeez et al. .............. 375/341 |
| 6,839,390 B2* | 1/2005 | Mills ........................... 375/341 |
| 6,947,506 B2* | 9/2005 | Mills ........................... 375/346 |
| 2003/0204808 A1* | 10/2003 | Mills ........................... 714/786 |

OTHER PUBLICATIONS

Alexander et al. "Iterative Multiuser Interference Reductin: Turbo CDMA", IEEE Transactions on Communications, vol. 47, No. 7, Jul. 1999.*

* cited by examiner

*Primary Examiner*—Emmanuel Bayard
(74) *Attorney, Agent, or Firm*—Joseph E. Funk (57) ABSTRACT

A multi-user decoder is disclosed in which interfering users are assigned to levels of a decoding tree constructed in the decoder dependent on the power levels of the user's received signals and for each symbol interval. By building the decoding tree in this manner for each symbol interval, a reduced complexity search is more likely to include paths and nodes in the tree containing the correct value for the channel symbols.

11 Claims, 3 Drawing Sheets

METHOD AND APPARATUS FOR OPTIMIZING TREE PRUNING IN A MULTIUSER DETECTOR

RELATED APPLICATION

This application is related to U.S. Pat. 6,947,505 entitled "System for Parametric Estimation and Tracking of Interfering Digitally Modulated Signals".

FIELD OF THE INVENTION

This invention relates to the field of communications and more particularly to an improved method and apparatus in a receiver for multi-user detection utilizing tree pruning.

BACKGROUND OF THE INVENTION

The present invention belongs to the art of multiple access communications systems such as, but not limited to, wireless Local Area Networks (Wireless LANS), cellular land-mobile communications systems, mobile satellite communications systems, and memory storage and retrieval devices. Such systems are characterized by at least one fixed base or relay station attempting to maintain communications with a plurality of subscriber stations or terminals that are each assigned a different time slot (TDMA), a different frequency slot (FDMA), or different signature waveform (CDMA), to name a few examples.

In such systems, capacity to support a large number of subscribers is measured in units such as bits per second per Hertz per cell or other physical dimension such as a sector in a cellular system or square microns in a disk storage system. (e.g. the sum of the information data rates, Bits/sec, of all the users in the system). Of primary interest is the maximum number of users that can operate within the system without having to decrease the information rate that they are already accustomed to using or increase the total bandwidth occupied by the system. The capacity can be increased by using more MHz of bandwidth, by reducing the area covered by each base station so that there are more base stations per square kilometer, by decreasing the frequency spacing between channels, and by transmitting more than one signal in the same frequency channel or time slot. However, reducing cell size or reducing the number of signals received by the detector is not always possible or economically feasible. When such action is possible, it increases the infrastructure cost. In addition, some of the above listed solutions increase inter-symbol interference (ISI) and multi-user interference (MUI), also called co-channel interference. ISI is caused by a signal being received along with a delayed version thereof caused by a reflection of the signal from an object such as a large building. MUI discoursed by the receipt of another signal having the same frequency, often meant to be received at a different receiver. In addition, received signals are typically corrupted by additive Gaussian noise.

In order to be able to further accommodate increased traffic, and to make maximum utilization of a traffic channel, multiple interfering signals may be transmitted on the same communication channel and are purposely allowed to interfere with one another. The effects of the resulting multi-user interference are then removed at the receiver by a multi-user detector (MUD). Using a MUD does not require a change in the existing transmitted signaling method, making it an attractive option.

To separate multiple interfering signals transmitted on the same communication channel some unique apriori knowledge of each of the signals is required. For this purpose a parameter estimation unit is required, such as disclosed in U.S. Pat. No. 6,947,505, entitled "System For Parameter Estimation And Tracking Of Interfering Digitally Modulated Signals". The parameter estimation required to attain this apriori knowledge may be done using "blind" parameter estimation, "non-blind" parameter estimation, or parameter estimation with the aid of training sequences. This last method is typically derived using a "training signal" or other knowledge of received signals in a manner well known in the art. The purpose of the parameter estimation unit is to identify and determine parameters associated with each signal that are required by the multi-user detector (MUD) to separate each signal from the other interfering signals, regardless of the fact that the signals exist in the same communications bandwidth and at the same instant in time. These parameters might include the received power, the phase of the oscillator which generated each received signal, the timing offset relative to the base station clock, carrier frequency, any frequency offset of the carrier, the assigned spreading code, and the structure of multi-path replicas.

To successfully demodulate simultaneously occurring interfering signals, signal processing of the received signal is accomplished utilizing multi-user detection (MUD) techniques. Early work in MUD, described in *Multi-user Detection* by S. Verdu, Cambridge University Press, 1998 proposed using computationally intense maximum likelihood (ML) exhaustive search techniques to separate the interfering signals. In certain applications, linear MUD detectors with lower computational demands may be used, and such MUD detectors are described by Verdu. However, the reduction in performance, particularly in high-interference situations, is so significant as to make those reduced complexity techniques not applicable. One method of implementing a ML is the well-known decoder known as the Viterbi decoder. A Viterbi decoder is based upon the Viterbi algorithm and performs a breadth first decoding search of all paths through an entire code tree (or trellis, which is a more compact representation of the code tree) by extending paths through the tree and the entire tree is searched. The complexity of the maximum likelihood (ML) Viterbi decoder in the context of many applications is prohibitively high.

The M-algorithm is a tree-pruning technique that approximates the operation of a ML Viterbi decoder at reduced complexity. The M-algorithm is a breadth first decoding algorithm, but with the M algorithm only the best M paths are retained at each level in the tree. This reduced tree search, referred to as "tree pruning", reduces the number of calculations that must be made and therefore speeds the overall tree processing.

Viterbi algorithm decoders and M algorithm decoders are also well known in the art as maximum likelihood decoders which can be used in systems that employ error correcting codes, such as convolutional codes, tree codes, and a variety of other codes, all of which can be generally characterized by a tree. The basic concept of these decoders can be described as correlating all possible transmitted sequences with the received sequence and then choosing as the "best" or "maximum likelihood" path the sequence whose correlation is a maximum.

A tree consists of a sequence of concatenations of a so-called tree diagram, or state transition diagram. The tree diagram defines, for each code state, which next state or states the encoder is allowed to transition to. The allowable transitions from one state to a next state are limited. Each possible transition from one state to a next state in a tree is called a branch. Each branch, therefore, corresponds to a subset. A sequence of signal points selected from a sequence of interconnected branches is called a path through the tree.

Transmitted signal points in signal space are displaced at the receiver due to noise and channel-induced distortion. In the case of a single transmitter and inter-symbol interference (ISI), or employment of a convolutional error correction code, a receiver may use a Viterbi algorithm decoder or an M algorithm decoder, operating on a received version of the stream of transmitted signal points, to perform the aforementioned maximum likelihood sequence detection or an approximation of ML sequence detection, respectively. Based on the received version of the transmitted signal points and the knowledge of the tree code used by the encoder and/or the ISI structure, the decoder determines the most likely sequence of signal points that was actually transmitted. The decoder performs this function by forming a decision as to what was the most likely transmitted signal point that would have caused the encoder to transition into a next state of the code. The technique works on concepts that can be modeled as a progression of states that branch out in a tree form of. In the case of interfering signals, a tree can be formed that represents all possible choices of the transmitted values for all signals. That is, error correction coding is not necessarily assumed for tree decoding and doesn't necessarily dictate the formation of the tree. Rather, the tree is formed by the fact that different hypotheses for the received sequences are possible.

More particularly, a Viterbi algorithm decoder, an M algorithm decoder, or any other tree-search decoder forms paths through a tree by keeping track of so-called "metrics". A branch metric, a function of the received version of the signal point, is calculated for each current-to-next-state transition associated with each branch in the tree diagram. Every path through the tree which leads into a state has an associated path metric which is a function of the sum of the branch metrics for the branches that make up that particular path. Further, a path entering a current state may be extended through the tree and enter a next state by including a branch representing an allowed transition from the current state to the next state. The path metric for such an extended path is a function of the sum of (a) the path metric associated with the path as it entered the current state and (b) the branch metric associated with the included branch.

The Viterbi decoder compares the path metrics of the different paths entering a state and retains as one of the aforementioned surviving paths the path with the smallest path metric. All other paths entering that state are discarded. The surviving paths are used by the decoder to make a final decision as to the value of an earlier transmitted signal point.

To reduce the complexity of the tree search, thereby increasing the speed of testing multiple hypotheses, shortcuts may be deliberately taken in the processing with a tree decoder. For instance, the M-algorithm prunes the tree by retaining, at every stage in the tree, the best M paths through the tree. The computation complexity of a tree search is directly related to the number of hypotheses which must be tested, i.e. the number of paths through the tree which must be examined. For example, for an ML multi-user detector for which there are K interfering by binary phase shift keyed signals and which uses the Viterbi algorithm, the computational complexity is on the order of $2^K$ for each symbol interval. For the M-algorithm, the complexity is on the order of $K^{1.2}$ for each symbol interval. The reduction in complexity by using the M-algorithm is considerable, but not for very large values of K or for high data rates the complexity reduction is not enough. In addition, tree pruning carries with it the risk that the correct path through the tree is eliminated from consideration, which causes a decoding error. Judicious pruning is required. For the M-algorithm, as M is decreased, the complexity is reduced by the probability of incorrect pruning increases. That is, the need for accuracy limits the reduction in complexity that is feasible. The M-algorithm is described in greater detail further in the Summary of the Invention. See also U.S. Pat. No. 6,151,370 issued Nov. 21, 2000 which describes the M-algorithm. Tree pruning techniques also apply to maximum a posteriori (MAP) decoders.

To further improve the performance of a communication system, some coding schemes include interleavers at the transmitter, which mix up the order of the bits in each packet of bits during encoding. Thus, when interference destroys a few adjacent bits during transmission, the effect of the interference is spread out over the entire original packet and can more readily be overcome by the decoding process. Other improvements may include multiple-component codes which include coding the packet more than once in parallel or in series. However, as this invention is concerned with operation at the receiver, the interleavers included in the receiver are only the interleavers and de-interleavers that are necessary to reverse the operation of any interleaving done at the transmitter.

In short, despite all the decoding processing gains in the art there is still a need for an improved method and apparatus for signal processing simultaneously occurring, interfering signals to speed the decoding processing and allow for acceptable detection performance at real-time operational speeds.

SUMMARY OF THE INVENTION

The present invention provides an improved method and apparatus for processing simultaneously occurring, interfering signals using a multi-user detector (MUD) that contains a tree decoder, such as an M-algorithm or T-algorithm tree decoder, which speeds the pruning of a tree by improving tree construction and tree pruning to reduce signal processing time to a minimum. This is done by first using a parameter estimation unit, such as described in the Background of the Invention, to determine a number of unique parameters that uniquely define the characteristics of each of the plurality of received, interfering signals. These parameters include the phase of the oscillator used to generate each received signal, the timing offset relative to the base station clock, carrier frequency, any frequency offset of the carrier, the assigned spreading code, the structure of multi-path replicas and, most importantly, the received power of each of the received signals.

When a decoding tree is constructed in the turbo multi-user detector (MUD), one level of the tree is defined for each of the co-channel, interfering signals. However, unlike the prior art, as described in a paper by Paul D. Alexander, Mark C. Reed, John A. Asenstorfer and Christian B. Schlagel in IEEE Transactions on Communications, vol. 47, number 7, Pages: 1008–1014, July 1999, entitled "Iterative Multi-User Interference Reduction: Turbo CDMA", the parameter estimation unit determines which of the received signals has the strongest signal strength, and this signal is assigned to the lowest level (root) of the decoding tree. The second strongest signal is assigned to the second level of the tree, and so forth, with the weakest signal being assigned to the highest level of the tree adjacent the terminating nodes or leaves of the tree. By building the tree with the highest power signal being assigned to the first level of the decoding tree a reduced search is more likely to include paths (and nodes) containing the right answer. In other words, due to this power ordering in the tree, a low complexity suboptimal search of the tree will be less likely to chop off branches containing the correct answer, thus supplying the correct answer more often than when power ordering is not used.

This power ordering process of ordering the decoding tree is repeated for each symbol interval of the signals in each block of received data and results in pruning the decoding tree very quickly to properly decode the individual signals making up the co-channel, interfering signal.

In an alternative embodiment of the invention signal processing is done using a turbo multi-user detector (turbo-MUD) and during each symbol interval the power ordering determined at the beginning of the symbol interval is utilized for all iterations of decoding.

DESCRIPTION OF THE DRAWING

The invention will be better understood upon reading the following Detailed Description in conjunction with the drawing in which.

DETAILED DESCRIPTION

Figure 1:
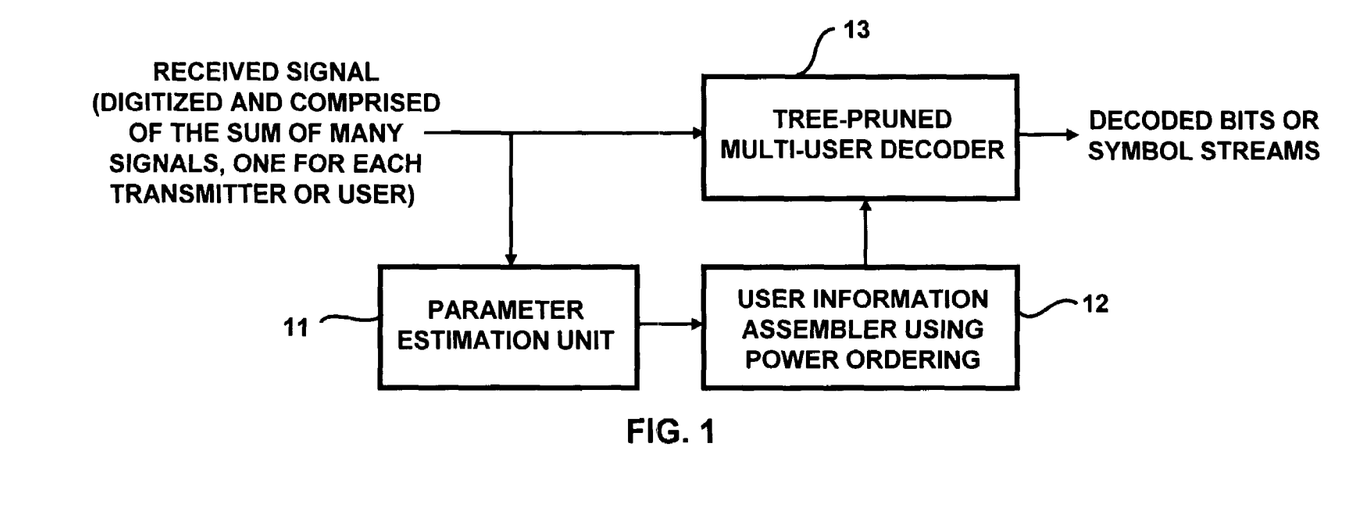
FIG. 1 is a simplified block diagram circuit of a portion of a prior art receiver that features the teaching of the invention using a tree pruned multi-user decoder with the addition of power ordering of the signal symbols in the levels of a decoding tree for each symbol interval.

FIG. 1 shows a simplified block diagram circuit of a portion of prior art receiver with the novel addition of re-ordering the users assigned to the levels of the tree-pruned, multi-user (MUD) decoder 13 based on the power level of the received signals associated with each user or transmitter at each symbol interval. Not shown in FIG. 1 is other typical receiver circuitry used to receive radio frequency signals and that prepare the received signals for decoding by decoder 13. In addition to decoder 13 there is also a parameter estimation unit 11 and a user information assembler using power ordering unit 12.

More particularly, with the teaching of the present invention the levels of the decoding tree constructed in decoder 13 (described with reference to FIG. 3) are ordered by assembler using power ordering unit 12 such that the received signal having the highest signal strength is assigned to the lowest level (root) of the decoding tree and the weakest signal is assigned to the highest level of the decoding tree adjacent the terminating nodes or leaves of the tree. This power ordering of the levels of the tree is preferably repeated for each symbol interval of the signals being decoded, but may be done on a less frequent basis. This speeds the pruning of a tree by improving tree construction and tree pruning to reduce signal processing time to a minimum.

The multi-user detector 13 is preferably based on the M-algorithm. The M-algorithm is a tree-pruning technique that approximates the operation of a ML Viterbi decoder at reduced complexity, as described in a paper by Paul D. Alexander, Mark C. Reed, John A. Asenstorfer and Christian B. Schlagel in IEEE Transactions on Communications, vol. 47, number 7, Pages: 1008–1014, July 1999, entitled "Iterative Multi-User Interference Reduction: Turbo CDMA". The M-algorithm is a breadth first decoding algorithm and only the best M paths are retained at each level in the tree. This reduced tree search, referred to as "tree pruning", reduces the number of calculations that must be made and therefore speeds the overall tree processing. The M-algorithm is described in greater detail in the Background of the Invention, and is not repeated here to avoid detracting from the description of the present invention.

The operation of tree-pruned, multi-user detector 13 assumes knowledge of various parameters about the received signals such as relative received timing offsets, carrier phase, frequency offsets, multi-path structure for each of the interfering signals present in the received signal, and the power level of the received signals. A parameter estimation unit 12 is therefore needed. Very briefly, parameter estimation units are used to identify and determine parameters associated with each signal that are required by a multi-user detector (MUD) to allow the MUD to correctly process the received signal and separate out each user's bit stream regardless of the fact that the transmitted signals exist in the same communications bandwidth and at the same instant in time. These parameters include the received power level, the phase of the oscillator which generated each received signal, the timing offset relative to the base station clock, carrier frequency, any frequency offset of the carrier, the assigned spreading code if any is used, and the structure of multi-path replicas. In the present invention the received power is used to order the decoding tree in decoder 13.

The power level information for the received signals is output from parameter estimation unit 11 and is input to assembler using power ordering unit 12. Unit 12 uses this information to build the decoding tree in decoder 13 with the highest power signal being assigned to the first level of the decoding tree, the second strongest signal being assigned to the second level of the tree, and so forth, with the weakest signal of being assigned to the highest level of the tree adjacent the terminating nodes or leaves of the tree.

In addition, this power ordering process is repeated for each symbol interval in each block of received signal data and results in pruning the decoding tree very quickly to properly decode the individual signals making up the co-channel, interfering signals. That is, a newly ordered decoding tree, ordered by power ordering unit 12 as described above, is constructed in decoder 13 for each time interval in which a symbol of each received signal is being received and is to be separated and decoded by decoder 13. Operating in a manner well known in the art, as described in the Alexander et al paper cited in the Summary of the Invention, the multiple, interfering, received signals entering decoder 13 are decoded and decoded data bits/symbol stream are output therefrom are as shown in FIG. 1 for each user present on the system.

By building the tree with the highest power signal being assigned to the first level of the decoding tree and successive levels associated with users in decreasing power order, a reduced search is more likely to include paths (and nodes) including the right answer. In other words, due to this power ordering in the decoding tree, a low complexity suboptimal search of the tree will be less likely to chop off branches containing the correct answer, thus supplying the correct answer more often than when power ordering is not used.

For example, let us assume that there are four interfering signals arbitrarily labeled A, B, C & D. Let us also assume that during the first symbol interval the order of the signals in decreasing level of power is B, C, A & D, that during the second symbol interval the order of the signals in decreasing level of power is C, B, D & A, and that during the third symbol interval the order of the signals in decreasing level of power is B, C, D & A. Thus, during decoding of the first symbol, user information assembler 12 uses the power level information to assign signal B to the lowest or root level of the decoding tree, assigns signal C to the second level of the decoding tree, assigns signal A to the third level of the decoding tree, and assigns signal D to the highest or leaf level of the decoding tree. During decoding of the second symbol, user information assembler 12 uses the power level information to assign signal C to the lowest or root level of the decoding tree, assigns signal B to the second level of the decoding tree, assigns signal D to the third level of the decoding tree, and assigns signal A to the highest or leaf level of the decoding tree. Finally, during decoding of the third symbol, user information assembler 12 uses the power level information to assign signal B to the lowest or root level of the decoding tree, assigns signal C to the second level of the decoding tree, assigns signal D to the third level of the decoding tree, and assigns signal A to the highest or leaf level of the decoding tree.

Figure 2:
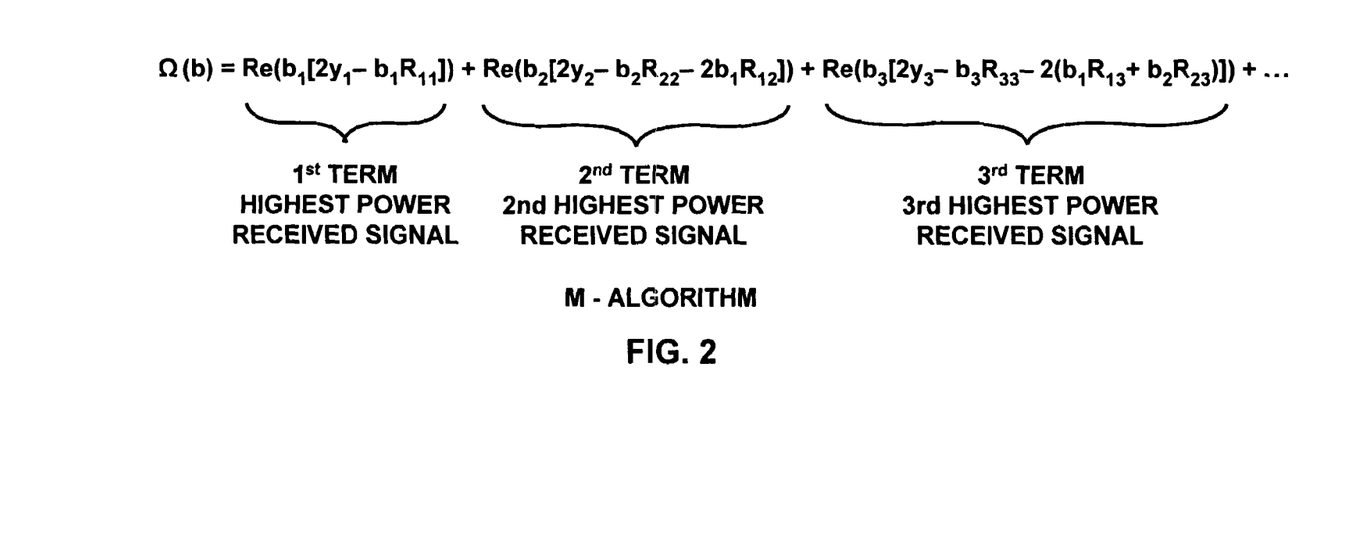
FIG. 2 shows an equation representing an M-algorithm used to implement power ordering a tree pruned multi-user decoder.

In FIG. 2 is shown the mathematical expression of an M-algorithm/metric. As may be seen therein, the first term in the algorithm represents the received signal having the highest power level; the second term in the algorithm/metric represents the received signal having the next highest power level; the third term in the algorithm/metric represents the received signal having the third highest power level; and so forth.

Omega represents the real-valued metric value calculated for a complete path through a tree using the equation; $b_1$, $b_2$ etc. are the binary values of a transmitted data symbols of each individual signal in the co-channel, interfering signals and are either a +1 or −1, and both values (+1 and −1) are tried in the equation in each symbol hypothesis to determine the lowest metric value; $R_{11}$, $R_{12}$ etc., are entries in the correlation matrix formed by the signature vectors of all the interfering users over the time frame associated with the data sequences of interest, and in the present invention are each calculated using the parameter estimates determined in unit 11 for each of the signals that actually make up the received signal; and $y_1$, $y_2$ etc. are vector space representations of the outputs of a bank of matched filters or bank of whitening matched filters (not shown in the Figures but known in the prior art) for all received interfering signals. Each term on the right-hand side of the equation represents a level of the decoding tree and all of the possible hypotheses branching from each node at the previous level.

As previously described, prior art decoders calculate the metrics of many complete paths through a tree between the tree root and each terminating node or leaf of the tree. The path through a tree having the "best" metric value defines the nodes and thereby the value of the "b" terms (+1 or −1) for each individual signal bit comprising the co-channel, interfering signal. Depending on the mathematical representation used for the metric in the tree construction, the path with either the largest or the smallest metric is chosen as the most likely path. The choice of relying on the smallest metric or largest metric is based on which choice produces the highest probability of being correct. The variations associated with these implementation details are well known in the art. While the use of tree pruning algorithms reduces the computational complexity required to determine a "best" path through the decoding tree, their complexity improvement is limited due to bit error rate performance constraints. That is, pruning can eliminate the correct path from consideration within the decoder, causing a decoding error and degrading the overall performance while speeding the processing speed. The tradeoff between processing speed and overall bit error performance is a delicate one that prior art has not resolved to the point of allowing for real time processing for a large number of interfering signals at reasonable bit error rates, especially at high data rates.

In accordance with the teaching of the invention, the order in which hypotheses are examined is changed so that the terms of the M-algorithm/metric are arranged in decreasing levels of signal power. In this way, the number of paths examined in the decoding tree of multi-user decoder 13 from root to leaf is reduced without increasing the likelihood of improperly pruning the true best path through the decoder. Thus, the decoding process is greatly speeded up without affecting overall error performance.

To accomplish this, during the time period of any given symbol interval the equation parameters for the user signal having the highest power level are inserted into the first term of the M-algorithm/metric equation shown in FIG. 2. The value of the first term of the M-algorithm along with the two possible values of "$b_1$" (+1 and −1) for that user are calculated and saved. Two metric values are calculated, the value of $b_1$ (+1 or −1) yielding some number "M" of the best metric values are retained. The process progresses from the first term to the second term of the equation.

During the same time period the equation parameters for the user signal having the second highest power level are inserted into the second term of the M-algorithm/metric along with ones of the previously saved surviving estimates of $b_1$ from the first term of the algorithm and other information from a matched filter or whitening matched filter and parameter estimation unit 11. Metric values are again calculated, the paths and values of $b_2$ (+1 or −1) combined with the surviving possible estimates for $b_1$ to yield some number "M" of the best metric values that are again retained.

On the received signal collected during the same time period the process progresses from the second term to the third term of the equation and all subsequent terms of the equation until the pruned tree has been examined to the decoding tree stage containing the leafs. This process results in pruning the tree very efficiently, with both speed and accuracy.

By building the tree for each symbol interval with the user associated with the signal having the highest power level being assigned to the lowest level of the tree and so on, as described above, a reduced search using the M-algorithm based multi-user decoder 13 is more likely to include paths (and nodes) that contain the correct answer. In other words, a low complexity suboptimal search of the tree will be less likely to chop off branches containing the correct answer, thus supplying the correct decoding answer more often than when power ordering is not used.

Figure 3:
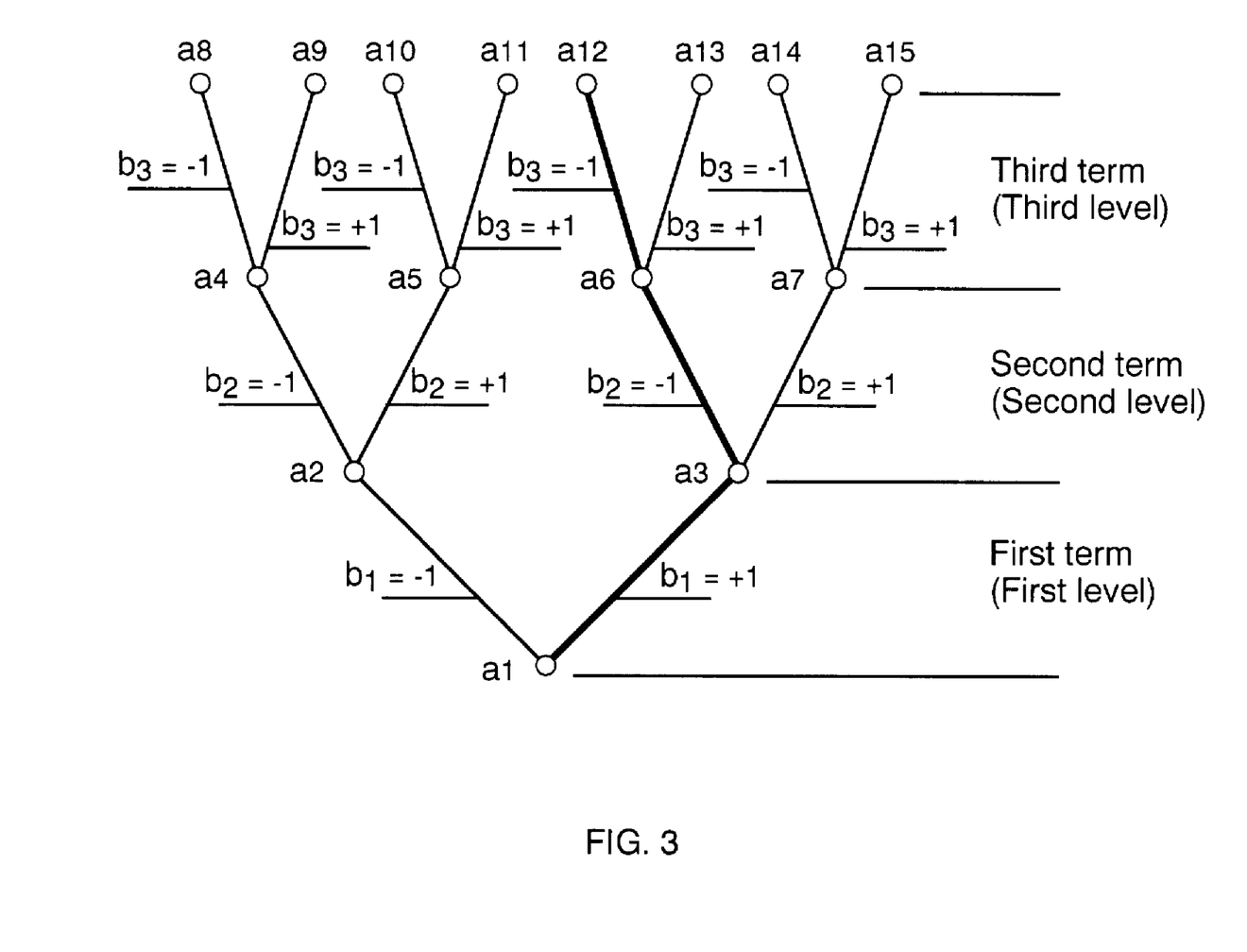
FIG. 3 is a simple representation of a decoding tree used to explain the operation of the invention.

In FIG. 3 is shown a simple representation of a decoding tree used to explain the operation of the invention. It is assumed for this simplified description that severe pruning is occurring and only one path or branch, the path having the lowest calculated metric is of interest. In reality there will be many more branches in each level of the decoding tree and two or more of the lowest value metrics will be saved and used in calculating metric values for the second, third and other terms in the equation. Thus, the darker line between nodes $a_1$ and $a_3$ represents the lowest calculated metric value for the first term of the equation and yields a symbol value of +1 for the user having the highest signal strength during the symbol interval. In addition, the branch between nodes $a_1$ and $a_2$ is rejected because it does not have the lowest calculated metric value.

The values/parameters for the signal having the second highest power level, as determined by parameter estimation unit 11, are utilized in the second term of the M-algorithm. These values are inserted into the second term of the M-algorithm along with $b_1=+1$ and the two possible values of "$b_2$" (+1 and −1), and the value of the second term is calculated for each branch in the second level of the decoding tree. The inserted value of $b_2$ (+1 or −1) yielding the highest metric value is discarded (between nodes $a_3$ and $a_7$) and the inserted value of $b_2$ (+1 or −1) yielding the lowest metric value is retained. In this simple example this is the branch between nodes $a_3$ and $a_6$ and the value of the symbol for the user having the second highest signal strength during the symbol interval is −1. The process has progressed from node $a_3$ to branch node $a_6$ and the estimated value of $b_2$ has been determined as $b_2=-1$.

Finally, the values/parameters for the third highest power received signal obtained by parameter estimator 11 are utilized in the third term of the M-algorithm. These values are individually inserted into the third term of the M-algorithm along with $b_1=+1$, $b2=-1$ and the two possible values of "$b_3$" (+1 and −1) and the value of the third term is calculated. The inserted value of $b_3$ (+1 or −1) yielding the highest metric value is discarded and the inserted value of $b_3$ (+1 or −1) yielding the lowest metric value is retained. In this case the retained symbol value is $b_3=-1$. The process has progressed from node $a_6$ to branch node $a_{12}$ and the estimated value of $b_3$ has been determined.

At this point the estimated values for $b_1$, $b_2$ and $b_3$ have been determined and the value of the symbols for three signals comprising the received signal in the signal interval are decoded.

While decoding using a tree where power ordering is utilized as previously described, it must be recognized that sometimes of the two or more paths leading into a level/node in a tree, that the path having the smallest metric may not ultimately yield the smallest overall path metric once extended through the decoding tree because the branch metrics for each branch, even though extending from the same level, are path-dependent and therefore different. That is, it is possible that a path leading into a level which was not the sole surviving path as described in the previous paragraphs, can nonetheless sometimes become a path with a lower path metric once the path has been extended from that level to another level higher in the tree.

In reality, instead of retaining only the metric value for a single path in a tree level as described above (the branch having the lowest metric), the "M" paths having the lowest metric values are retained between all the nodes at that level. Thus, if M=2 then the two paths in each level of the tree having the two lowest metric values is retained. As the metric values for other branches in the pruned tree are determined they are utilized over multiple branches of the decoding tree to determine if the lowest metric value among all the surviving paths has indeed been determined using the teaching of the present invention.

It should be noted that in utilizing the teaching of the present invention to prune the decoding tree in FIG. 3 that the metrics of the great majority of branches and complete paths through the decoding tree are not calculated. Therefore, the tree has been pruned in a very rapid, severe manner.

While the tree shown in FIG. 3 only has three levels reflecting three terms in the M-algorithm for three individual user signals making up a received signal, any number of levels may be constructed into a tree to decode a like number of received signals. In addition, while the example described herein utilizes the M-algorithm, the teaching of the invention may be used with other tree pruning algorithms.

In addition, a rather simple tree example has been used to describe the operation of the invention. If however, more complex signals are being processed, such as Quadrature Phase Shift Keying (QPSK) signals that have additional quadrature terms +j and −j, the complexity of the decoding tree grows exponentially. The first level of the tree shown in FIG. 3 will have four branches instead of two, the second level of the tree will have sixteen branches instead of four, and the third level of the tree will have sixty-four branches instead eight. Even with the increased complexity the operation of the invention is as previously described.

Further, any inter-symbol interference can be accommodated by assigning the various echoes of each user's signal a "user number", hence, giving each multi-path replica a level on the tree. This is a simple extension of the subject invention described herein and is commonly understood by one skilled in the art of ML equalization and Viterbi decoding.

Figure 4:
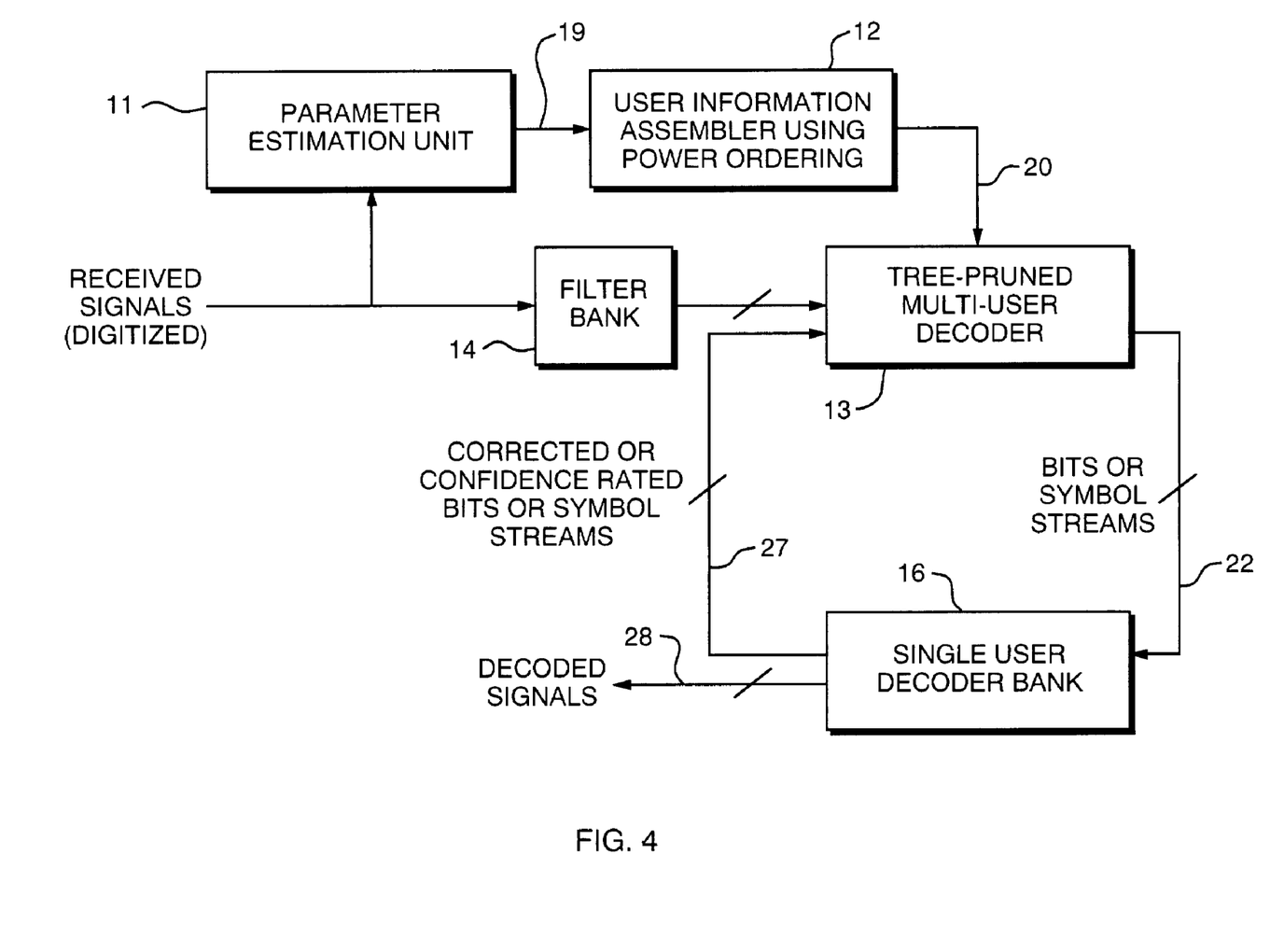
FIG. 4 is a simplified block diagram of an alternative embodiment of the invention showing a portion of a prior art receiver circuitry utilizing a turbo multi-user detector performing iterative turbo decoding to separate multiple interfering signals on the same communication channel, with the addition of power ordering of the signal symbols in the levels of a decoding tree for each symbol interval.

FIG. 4 shows a simplified block diagram of a portion of prior art receiver circuitry implementing turbo, iterative decoding for which a tree-pruned, multi-user detector comprise the MUD unit 14 where the ordering of the branches in the decision tree corresponds to the indices of active users and is based on the received power level of each user signal during each symbol interval in accordance with the teaching of the present invention. The assigned order of indices may be changed for every symbol interval as the power level of the received signals changes, as determined by user information assembler unit 12 which receives its information from parameter estimation unit 11. During each symbol interval the power ordered signals are iteratively processed by multi-user decoder (MUD) 13 and bank of single user decoders 16.

If interleaving is applied to the data sequences at the transmitters, de-interleaving and interleaving units (not shown) would be added to the block diagram in FIG. 4. For simplicity, FIG. 4 considers the case for which interleaving is not present at the transmitters.

A received, digitized signal passes through conventional receiver circuitry (not shown) and is then input to parameter estimation unit 12 which utilizes unique apriori knowledge of the system specification (which characterizes each of the transmitted signal pulses and modulation type) to help identify parameters for each received signal, regardless of the fact that the signals exist in the same communications bandwidth and at the same instant in time. These parameters include the received power, the phase of the oscillator which generated each received signal, the timing offset relative to the base station clock, carrier frequency, any frequency offset of the carrier (phase difference), and the structure of multi-path replicas. This knowledge is typically derived using a parameter estimator in a manner well known in the art, or the training signal method disclosed in the above identified patent application entitled "System For Parameter Estimation And Tracking Of Interfering Digitally Modulated Signals". With the present invention knowledge of the power level of each received signal is required and is passed over lead 19 to the user information assembler unit 12.

The received, digitized signal is then passed through a bank of filters 14 for the purpose of capturing discrete measurements. A whitening matched filter of a type known in the art, which serves to cancel some inter-symbol (ISI) interference as well as reducing the correlation between symbols of interfering users may be used to offer the tree-pruned MUD an advantage, but is not the only choice for this filter bank. An example of such a whitening matched filter is described in detail in a related patent application cited at the beginning of this specification.

The whitened, digitized signal output from filter bank 14 is input to tree-pruned multi-user detector (MUD) 13 for iterative processing comprised of MUD 13, line 22, a bank of single user decoders 16, and line 27 back to MUD 13. At the same time power order information, as well as all other parameter values for each detected user, is passed from user information assembler unit 12 to MUD 13 via path 20. The information passed along path 20 tells MUD 13 the order in which to build its decoding tree by assigning the indices of active users within a symbol interval according to the power level of each received signal as determined by parameter estimation unit 11. Responsive thereto, MUD 13 constructs its decoding tree so that the signal having the highest power level is assigned to the lowest or root level of the decoding tree, the signal having the next highest power level is assigned to the second level of the decoding tree, and so on.

In the optimal case, MUD decoder 13 is a full-complexity MAP decoder, if prior information on each received bit is known, or an ML decoder if no prior information exists. Sub-optimal reduced complexity MAP or ML approaches for MUD decoder 12 may be used in an effort to achieve real-time performance. For this alternative embodiment of the invention, MUD 13 is preferably any tree decoder such as the M-algorithm tree decoder described in the Background of the Invention.

The output from multi-user decoder (MUD) 13 may be either hard or soft estimates of the signal symbols and are called "channel symbol estimates" in this description. When soft estimates are calculated they are also known as reliability measures, confidence measures and by other names. Using hard estimates reduces computational complexity, at a cost of degraded performance level. However, in this embodiment of the invention, either type of estimate (soft or hard) is possible for either the output of MUD 13 on line 22 or for the output of the bank of single user error correction decoders on line 27.

The novel difference in the operation of MUD 13 in FIG. 4 from the prior art is that the decoding tree that is constructed therein is responsive to power ordering of the users as determined by unit 12 which, for each symbol interval, orders the user indices of the parameter estimates based on the power levels of the different components of the received signal (one corresponding to each user) that comprise the aggregate received signal.

To accomplish this, user information assembler power ordering unit 12 is new. Unit 12 is used to control how MUD 13 constructs its decoding tree for each symbol interval The stream of channel symbol estimates for each user presently contributing to the received signal is calculated by MUD 13 and is input to one of a plurality of single-user decoders 16, with there being one single-user decoder 16 used for each user's signal to be decoded, and each decoder 16 corrects the bit or symbol stream over some period of time, typically corresponding to a frame of data. If the single user decoders 16 are soft-output decoders, they calculate conditional probabilities called "probabilities estimates" in this specification, one for each decoded symbol of each user, and output them as probability estimates on line 27. The probability estimates are also known as reliability measures, confidence measures and by other names. Soft-output decoders, such as MAP decoders, soft-output Viterbi algorithm (SOVA) decoders, or soft-output M-algorithm-based decoders, are all well-known in the art. If the single user decoders 16 are hard-output decoders, they calculate hard estimates of the symbols and output them as estimates on line 27. Hard estimates can be considered a special, restricted case of soft estimates, in which only two possible values (0 or 1) of probability estimates are possible. Hard-output decoders, such as Viterbi decoding, hard output M-algorithm, or T-algorithm decoders, are well-known in the art.

At the completion of the first iteration of processing of the signals through single user decoders 16 the individual signal bits then have probability estimates ranging between 0 and 1.0 that are forwarded via lead 27 to MUD 13 to be used in constructing the decoding tree for the next iteration of decoding. During each symbol interval the power ordering information sent over path 20 to MUD 13 remains unchanged Since there is only a single user associated with each of decoders 16 it is feasible to use a full-complexity ML or MAP decoder, SOVA decoder, or other hard or soft-output decoder in each single user decoder contained in unit 16 to look at all hypotheses in the single user decoding tree, not just the most likely hypotheses. The single-user decoders 16 each calculate a probability estimate for their respective signal and outputs it on lead 27 for use by MUD 13 in calculating the metrics on each branch of its decoding tree for the next iteration of decoding to allow for the tree-pruned decision algorithm to resemble a MAP-MUD in which prior information about the user bits/symbols can be taken into account.

The passing of information between MUD 13 and the single-user decoders 16 is repeated a predefined number of times, or until the desired bit error rate performance is attained, or until further iterations will result in insignificant changes in the probability estimates output from single user decoders 16 and therefore will not significantly improve the turboMUD bit error rate performance. At that point, the estimates of the decoded signals (i.e. estimates of the data sequences) are output from the single user decoders 16 over path 28. The above described operation is then repeated for the next frame interval.

The process of ordering the decoding tree in MUD 13 according to the power level of the received signals allows the pruning done in the tree decoder within MUD 13 to be done more correctly, or with fewer hypotheses examined, which reduces the overall complexity of the turboMUD detector and allows for real-time operation. Because the user ordering does not rely on confidence values to determine the ordering, the single user decoders can be lower complexity hard-output decoders and an ML version of a tree-pruned MUD can be used instead of the MAP version described in the above paragraphs.

While what has been described herein is the preferred embodiment of the invention it should be obvious to those skilled in the art that the teaching of the present invention may be applied to any field in which tree decoding is utilized, and the invention may be modified without departing from the spirit and scope of the invention. For example, the power ordering of the decoding tree maybe changed less frequently than on a per symbol interval basis.

What is claimed is:

1. Apparatus for decoding a plurality of received interfering signals corrupted by multi-user interference to identify estimates for each of the bits and symbols during each symbol interval of each of the plurality of received interfering signals, wherein the received interfering signals are in blocks of data, the apparatus uses a multi-user tree decoder based on an algorithm defining a tree decoder having a plurality of node levels equal to the number of received interfering signals from which the symbols estimates are derived, wherein the tree decoder has a plurality of nodes at each level corresponding to the possible values taken of a bit or symbol, and the tree decoder comprises a root node, intermediate nodes and leaf nodes, and branches connect the root node and intermediate nodes to all nodes at the next higher level, with the first or highest order term of the decoder tree being assigned to the first or root node level of the decoder tree, the second or next highest term of the decoder tree being assigned to second node level of the decoder tree, and so on, and subsequent decoding is done by single user decoders using output from the multi-user tree decoder, and wherein a parameter estimator provides information about each of the plurality of received interfering signals, the apparatus for decoding each of the plurality of received interfering signals comprising:

means for determining the received signal strength of the each transmitter at the beginning of each symbol interval using information from the parameter estimator;

means for assigning ones of the plurality of received interfering signals to the node levels of the decoder tree based on the received power level of each of the received interfering signals, with the one of the plurality of received interfering signals determined to have the highest received signal strength at the beginning of each symbol interval to the first level of the tree decoder-adjacent the root node for decoding, and there are multiple iterations of decoding during each symbol interval; and first means for decoding each of the plurality of received interfering signals in each of the blocks of data to determine symbol estimates for each of the bits and symbols in each of the plurality of received interfering signals for each of the multiple iterations of decoding;

second means for decoding each of the plurality of received interfering signals using the symbol estimates determined by the first decoding means to determine probability estimates for each of the bits and symbols in each of the plurality of received interfering signals, the probability estimates determined during one iteration of decoding being used in a next iteration of decoding by the first decoding means;

means for making a determination of the value of each symbol or bit of each of the plurality of received interfering signals for each symbol interval using the probability estimates determined by the second decoding means after a number of the iterations of decoding have been performed during each symbol interval.

2. The apparatus for decoding in accordance with claim 1 wherein the one of the plurality of received interfering signals having the highest received signal strength is assigned to the first or highest order term of the decoder tree for decoding, the one of the plurality of received interfering signals having the second highest signal strength is assigned to the second or next highest order term of the decoder tree for decoding, and so on for all the bits and symbols in each block of data.

3. The apparatus for decoding in accordance with claim 2 wherein the assignment of each of the plurality of received interfering signals to the node levels of the decoder tree is done for every block of data.

4. The apparatus for decoding in accordance with claim 1 wherein the assignment of the plurality of received interfering signals to the levels of the decoder tree is done at the beginning of each block of data.

5. A computer readable medium containing executable instructions for a method of decoding a plurality of received interfering signals corrupted by multi-user interference to obtain estimates for each of the plurality of received interfering signals for each block of data in the signals, the method uses a multi-user decoder based on an algorithm defining a decoder tree having a number of levels equal to the number of received interfering signals from which estimates are derived, wherein the decoder tree has a plurality of nodes at each level corresponding to the possible values taken of a bit or symbol, with the first or highest order term of the algorithm being assigned to the first or root level of the decoder tree, the second or next highest term of the algorithm being assigned to second level of the decoder tree, and so on, and subsequent decoding is done by single user decoders using output from the multi-user tree decoder, and wherein a parameter estimator provides information about each of the plurality of received interfering signals, and the instructions for decoding the plurality of received interfering signals comprise instructions for:

(a) determining the received signal strength of each transmitter at the beginning of each symbol interval using information from the parameter estimator;

(b) assigning each of the plurality of received interfering signals being decoded to the levels of the decoder tree based on its power level, with the one of the interfering signals determined by the parameter estimator to have the highest signal strength at the beginning of each symbol interval to the first level of the tree decoder-adjacent the root node for decoding, and there are multiple iterations of decoding during each symbol interval;

(c) decoding the received interfering signals from the each transmitter in the multi-user tree decoder to determine symbol estimates for each bit or symbol during each symbol interval of each of the plurality of received interfering signals for a first of multiple iterations of decoding;

(d) decoding the plurality of received interfering signals from the each transmitter in a single user decoder using the symbol estimates determined in step (c) to determine probability estimates for each of the bits and symbols in each of the plurality of received interfering signals for the first iteration of decoding;

(e) repeating steps (c) and (d) for subsequent iterations of multiple iterations of decoding during each symbol interval, with the probability estimates determined in step (d) for one iteration of decoding being used in the multi-user tree decoder in step (c) for a subsequent iteration of decoding; and (f) making a determination of the value of each symbol or bit in each of the plurality of received interfering signals for each symbol interval using the probability estimates after a number of the subsequent iterations of decoding in step (e) have been performed during each symbol interval.

6. The computer readable medium in accordance with claim 5 wherein the one of the plurality of received interfering signals having the highest signal strength, based on information from the parameter estimator, is assigned to the first or highest order term of the decoder tree for decoding, the one of the plurality of received interfering signals having the second highest signal strength, based on information from the parameter estimator, is assigned to the second or next highest order term of the decoder tree for decoding, and so on.

7. The computer readable medium in accordance with claim 6 wherein the assignment of each of the plurality of received interfering signals to the levels of the decoder tree is done for each block of data in the plurality of received interfering signals.

8. The computer readable medium in accordance with claim 5 wherein the assignment of each of the plurality of received interfering signals to the levels of the decoder tree is done for every block of data signals.

9. A method for use in a decoder to decode a sequence of bits or symbols corresponding to a plurality of received interfering signals that are corrupted by inter-symbol interference and by other interference, to identify the value of the bits or symbols for each of the plurality of received interfering signals during each symbol interval for each of the plurality of received interfering signals, and the decoding method is carried out via a search using a multi-user tree decoder that has a number of levels equal to the number of the plurality of received interfering signals, wherein the tree decoder has a plurality of nodes at each level corresponding to the possible values taken of a bit or symbol, and the tree decoder comprises a root node, intermediate nodes and leaf nodes, and branches connect the root node and intermediate nodes to all nodes at the next higher level, and subsequent decoding is done by single user decoders using output from the multi-user tree decoder, and wherein a parameter estimator provides information about each of the plurality of received interfering signals, the method comprising the steps of:

(a) determining the received signal strength of each transmitter at the beginning of each symbol interval using information from the parameter estimator;

(b) assigning the transmitter corresponding to the one of the plurality of received interfering signals determined to have the highest signal strength at the beginning of each symbol interval to the first level of the tree decoder-adjacent the root node for decoding, and there are multiple iterations of decoding during each symbol interval;

(c) decoding the received interfering signals from each transmitter in the multi-user tree decoder to determine symbol estimates for each bit or symbol during each symbol interval of each of the plurality of received interfering signals for a first of multiple iterations of decoding;

(d) decoding the plurality of received interfering signals from the each transmitter in a single user decoder using the symbol estimates determined in step (c) to determine probability estimates for each of the bits and symbols in each of the plurality of received interfering signals for the first iteration of decoding;

(e) repeating steps (c) and (d) for subsequent iterations of multiple iterations of decoding during each symbol interval, with the probability estimates determined in step (d) for one iteration of decoding being used in the multi-user tree decoder in step (c) for a subsequent iteration of decoding; and (f) making a determination of the value of each symbol or bit in each of the plurality of received interfering signals for each symbol interval using the probability estimates after a number of the subsequent iterations of decoding in step (e) have been performed during each symbol interval.

10. The method in accordance with claim 9 further comprising the steps of:

(g) assigning the transmitter corresponding to one of the plurality of received interfering signals having the lowest signal strength, based on information from the parameter estimator, to the level of the tree decoder adjacent the leaf nodes for each symbol interval; and (h) assigning the transmitter corresponding to one of the plurality of received interfering signals having intermediate levels of signal strength, based on information from the parameter estimator, to intermediate levels of the tree decoder in descending order from the level of the tree decoder adjacent to the root node to the level of the tree decoder adjacent to the leaf node of the tree decoder for each symbol interval.

11. The method in accordance with claim 10 wherein during each of the multiple iterations of decoding of the bits or symbols occurring during each symbol interval of the plurality of received interfering signals, the most likely M channel symbol estimates at each level of the tree decoder are saved, and all the saved M channel symbol estimates are used to determine the best channel symbol estimate for each of the received interfering signals during each symbol interval.

* * * * *